A. LOOMIS.
THROTTLE CONTROLLING MEANS FOR MOTOR VEHICLES.
APPLICATION FILED FEB. 16, 1909.
1,053,188.
Patented Feb. 18, 1913.
3 SHEETS—SHEET 3.
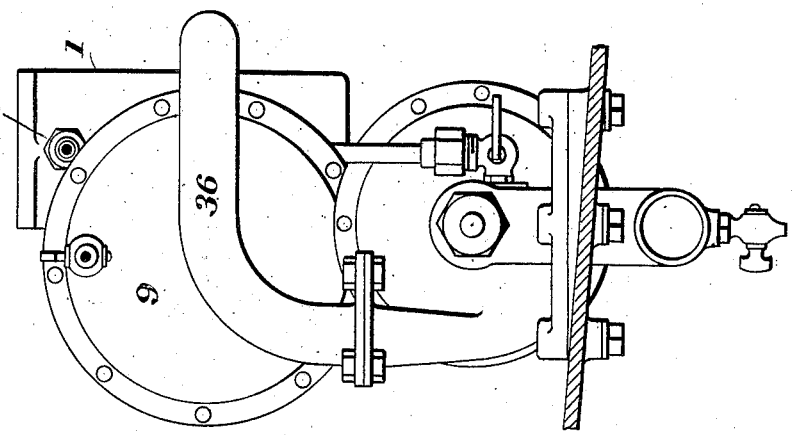
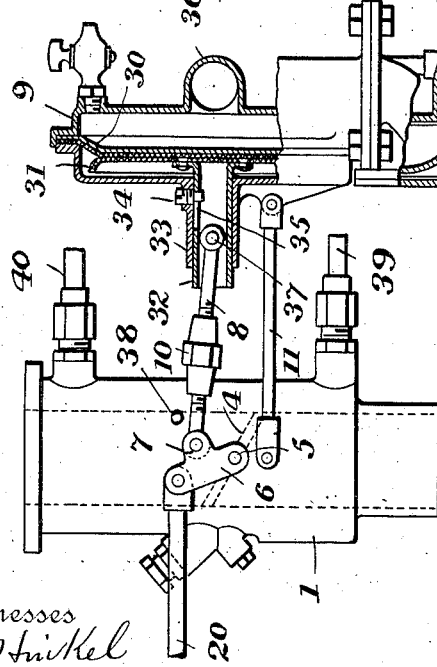
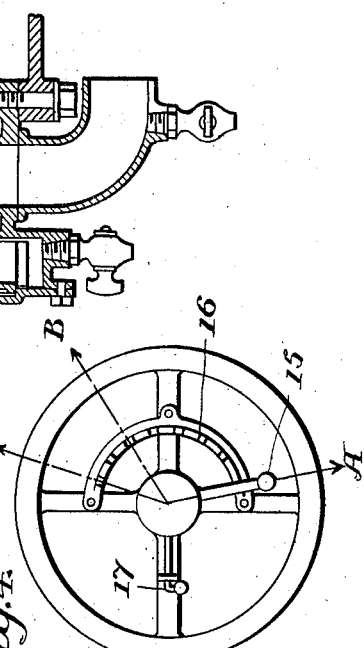

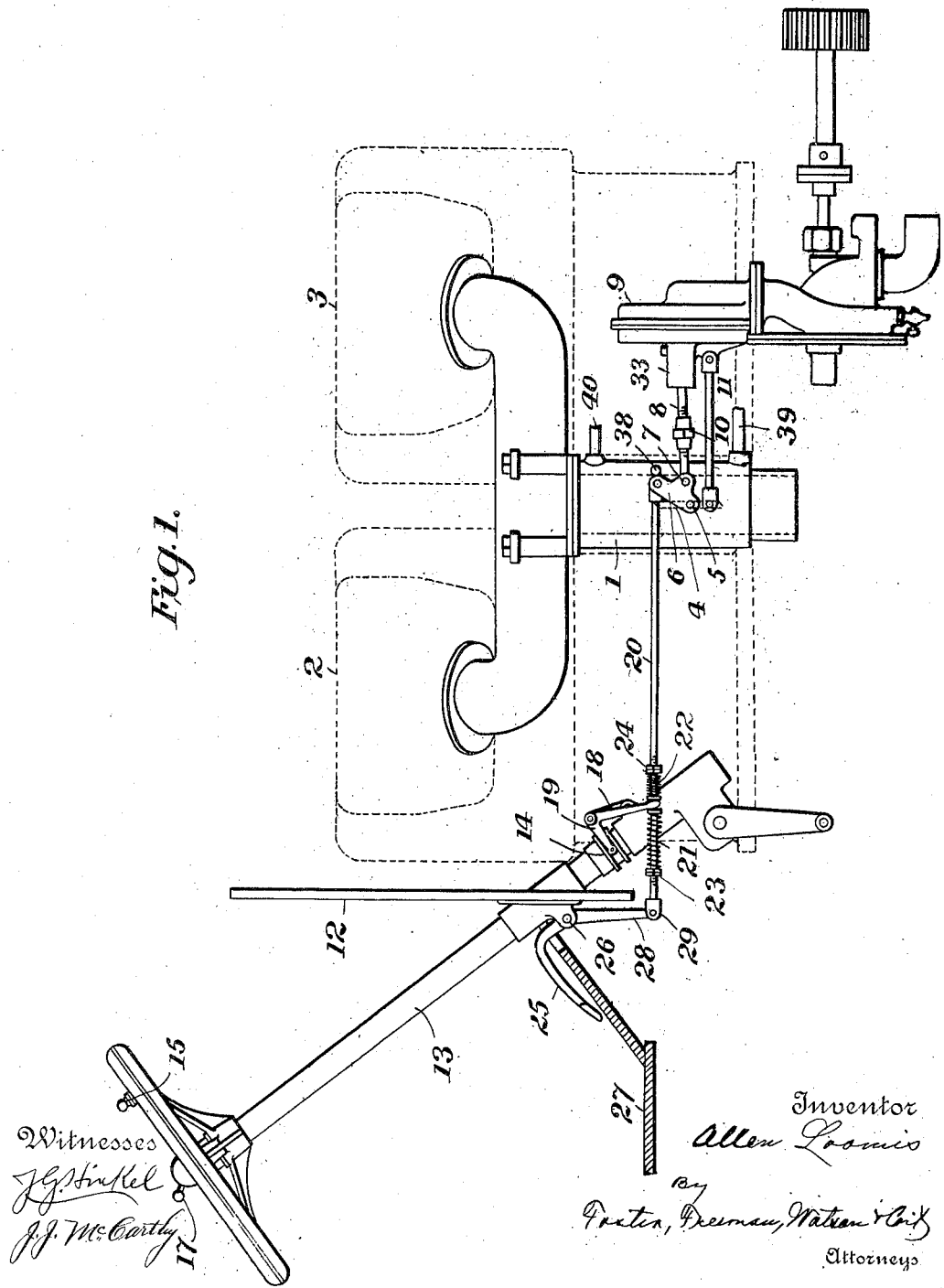
A. LOOMIS.
THROTTLE CONTROLLING MEANS FOR MOTOR VEHICLES.
APPLICATION FILED FEB. 16, 1909.
1,053,188. Patented Feb. 18, 1913.
3 SHEETS—SHEET 1.

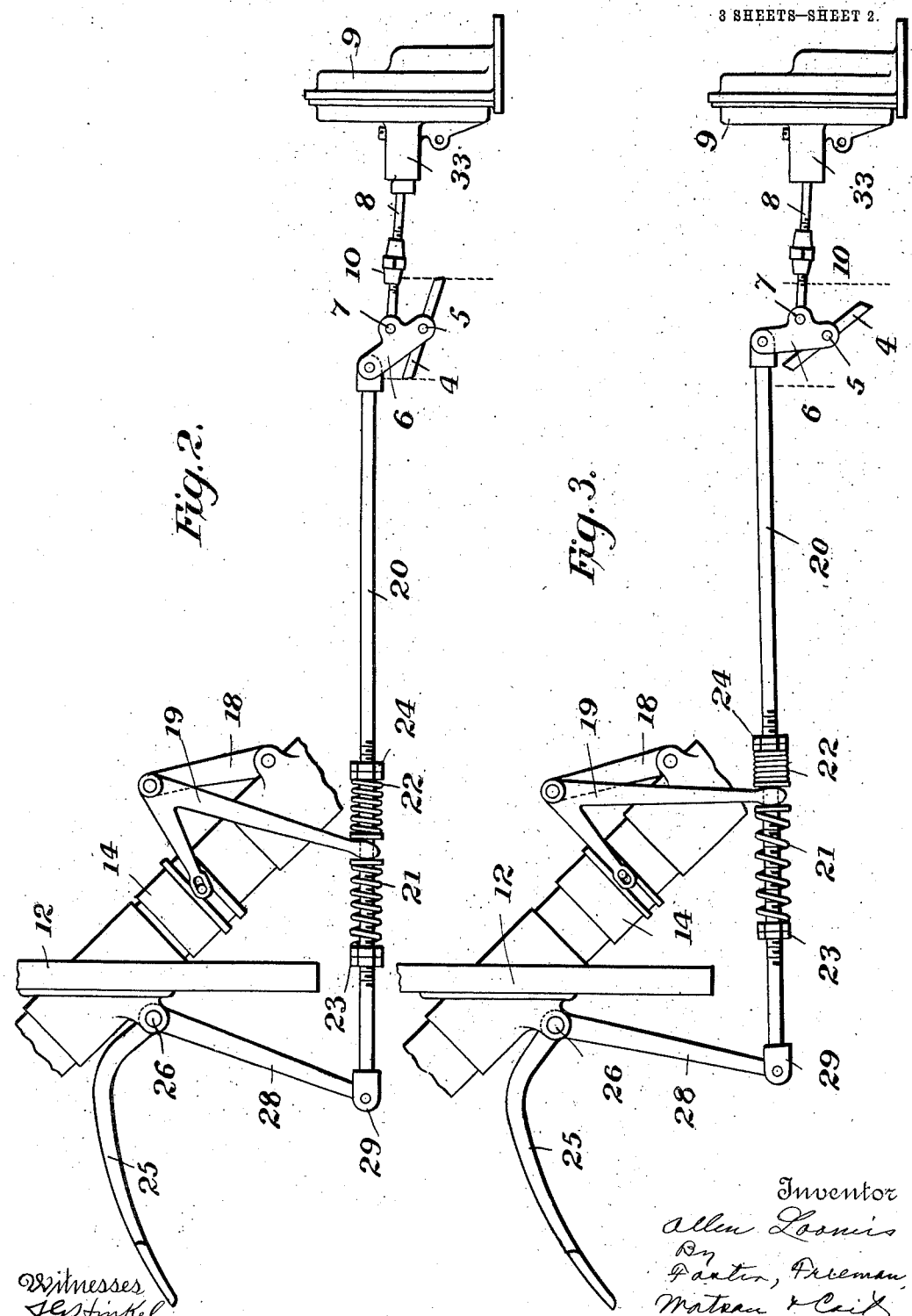

UNITED STATES PATENT OFFICE.

ALLEN LOOMIS, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

THROTTLE-CONTROLLING MEANS FOR MOTOR-VEHICLES.

1,053,188.          Specification of Letters Patent.          Patented Feb. 18, 1913.
Application filed February 16, 1909. Serial No. 478,329.

*To all whom it may concern:*

Be it known that I, ALLEN LOOMIS, a citizen of the United States, and resident of Detroit, in the county of Wayne and State of Michigan, have invented certain new and useful Improvements in Throttle-Controlling Means for Motor-Vehicles, of which the following is a specification.

This invention relates to motor vehicles, and particularly to means for controlling the throttle valve in the intake of the hydrocarbon motor. Its objects are to simplify and improve the throttle actuating mechanism, whereby it may be operated more easily and controlled more accurately.

To these ends the invention consists in the features hereafter more fully described.

In the accompanying drawings,—Figure 1 is a side view of a portion of a motor vehicle embodying my improved controlling mechanism; Fig. 2 is a detail view showing the controlling mechanism in closed position; Fig. 3 is a similar detail view showing the mechanism in a partially open position; Fig. 4 is a top plan view of the steering wheel of the motor vehicle having thereon my adjustable hand lever for controlling the throttle valve of the motor; Fig. 5 is a side view partly in section of an automatic hydraulic governor having my improved connection with the throttle valve; Fig. 6 is an end view of what is shown in Fig. 5.

As shown in the drawings, the throttle valve is provided with three means for actuating it. The first of these means consists of an automatically acting governor connected with the valve; the second consists of a hand lever at the top of the steering column of the vehicle operatively connected to the valve; and the third consists of a pedal lever at the floor of the vehicle connected with the valve, this last mentioned lever being ordinarily termed the accelerator pedal. The present invention resides in the construction of these operating means, and their relations to each other, whereby certain novel functions and results are secured as hereafter pointed out.

In Fig. 1 of the drawings, 1 represents the intake pipe which leads from the carbureter to the cylinders of the hydrocarbon engines 2 and 3. A butterfly throttle valve 4 mounted upon shaft 5 is placed in this intake pipe and controls the passage of the combustible fluid to the motors. Keyed to the shaft 5 there is an arm 6, and pivotally connected to this arm in a laterally projecting portion 7, is a link arm 8 connected at its other end to a governor 9, the length of this link arm being controlled by the turnbuckle 10. A rigid arm 11 connects the intake casing and the governor casing so as to maintain them in proper position and at the proper distance apart. The motor vehicle dash 12 supports the steering column 13 and mounted upon this column is a longitudinally sliding sleeve 14 which is operated by a hand lever 15 at the top of the steering column by means of connections on the inside of the hollow steering column 13. The particular structure of these connections forms no part of the present invention, being substantially that covered in the patent to Schmidt 775,991. The hand lever 15 extends radially from the steering column with its outer end near the rim of the steering wheel, and it makes adjustable engagement with the notched segment 16 mounted upon the spokes of the steering wheel. This engagement of the hand lever with the notched segment enables the operator to adjust this hand control to any desired position where it will be held firmly in place. A lever 17 mounted upon one of the spokes of the wheel is adapted to operate the spark control of the motor by connections which form no part of the present invention.

Mounted upon a projection 18 upon a fixed part of the base of the steering column is a bell crank lever 19 having one arm engaging the sliding collar 14 and also having a depending arm 19 provided with an eye at its lower end engaging the rod 20 which is connected to the throttle arm 6. Coiled springs 21, 22 surround the rod 20 on opposite sides of the arm 19 and bear against it, these springs being held in position by the adjustable nuts 23, 24. It will thus be apparent that the motion of the hand lever 15 is not imparted directly to the throttle arm 6, but has a flexible connection through the springs above described.

In Fig. 4 I have used the reference letters A, B and C to indicate certain positions of the hand lever 15, and the positions of the connections to the throttle valve, when this hand lever is in these positions, are shown in Figs. 1, 2 and 3. When the arm is in the position A the throttle valve is closed and the parts are in the positions shown in Fig. 2. When in the position B, the throttle valve is partially open as shown in Fig. 3, and it will be observed that in this position the spring 22 is fully compressed due to the action of the governor 9 tending to close the throttle against the action of the hand lever 15. In Fig. 1 the throttle valve is fully open with the parts corresponding to position C of the hand lever 15.

A foot lever 25 is pivotally supported at 26 upon a fixed portion of the steering column base and extends above the inclined portion of the vehicle floor 27. This foot lever is commonly termed the accelerator pedal and it has a depending arm 28 which is adjustably secured to the end of the rod 20 by means of the clevis 29. It will thus be apparent that the accelerator pedal is directly connected to the throttle arm 6 and will thus positivtly open the throttle whenever it is depressed. It will be observed that by the construction described the hand lever 15 may be adjusted to yieldingly hold the throttle valve at any desired position, and that while so held the accelerator pedal may be used to positively secure a further opening of the valve. As soon as the accelerator pedal is released the valve will return to the position where it is yieldingly held by the hand lever.

It is found in practice that at times it is desirable to control the speed of the motor almost entirely by the accelerator pedal 25 and in this case the hand lever 15 is placed in position A shown in Fig. 2, which holds the throttle valve 4 yieldably in closed position, in which position the motor will run at its minimum speed, mixture being supplied to it through a small bypass around the throttle valve, and the motor may then be accelerated by use of the pedal 25. But at other times or by other persons, it may be desirable to control the motor almost entirely by the hand lever 15. In such hand control the connection between the bell crank lever 19 and rod 20 including the compressible spring 22 has special advantages since by the arrangement of parts above described the motor may be delicately controlled by the hand lever 15 from a minimum speed of four or five miles per hour of the vehicle to a speed of twenty-five or thirty miles per hour of the vehicle, this range of speed being obtained by said lever between the positions A and B on the segment 16. But from position B to position C on the segment a much quicker opening of the throttle is obtained and approximately the maximum speed of the motor obtained at position C.

The delicacy of control above described depends upon the size and adjustment of the spring 22. This spring, as will be seen by reference to Figs. 2 and 3 is so designed with reference to the action of the governor that it is entirely compressed when the motor has reached the speed which drives the vehicle at about twenty-five or thirty miles per hour, this speed being reached when the throttle is open from one-third to one-half of its maximum. This compression of the spring is due to the fact that the governor is directly connected to the throttle arm and opposes the action of the hand operated means tending to open the throttle, and this opposition increases as the throttle opens. When the lever 15 is in the position A the throttle is closed and the spring 22 is open, but as the lever is moved to the position B the spring 22 is entirely closed as shown in Fig. 3, thus making a rigid connection between the bell crank lever 19 and the throttle valve. In moving from B to C therefore the lever 15 imparts its motion positively to the throttle without regard to the action of the governor. In other words, the first two-thirds of the travel of the hand lever is required to open the throttle valve one-third or one-half of its maximum and only the remaining one-third of the travel of the hand lever 15 is required to open the throttle the remaining two-thirds or one-half of its maximum. Thus a more delicate control of the vehicle is obtained up to twenty-five miles per hour, and thereafter the governor is practically cut out of action and the throttle valve may be opened wide by the hand lever.

In addition to the functions and advantages of the hand actuated control mechanism above described it serves the additional purpose of enabling the operator to partially overcome the action of the governor so as to make it easier to operate the accelerator pedal. In other words the hand lever 15 may be set in such a position as to partially compress the spring 22 and thus partially overcome the opposing action of the governor, and make it easier to depress the foot lever 25.

Since the governor, either of the fly-ball or hydraulic type, is connected directly to the throttle arm, it opposes the action of the accelerator pedal in opening the throttle valve, and in the constructions in common use it has been found that at high speed the opposing pressure of the governor is considerable, and it is impossible to hold the accelerator pedal down with the foot for any length of time without great fatigue. My invention includes means for overcoming this objection, by the provision of a novel connection between the governor and the throttle valve. This connection includes parts which have a toggle action which reduces the force with which the governor opposes the pedal. This construction is clearly illustrated in Figs. 1 and 5 where I have shown a governor of the hydraulic type.

The governor 9 is provided with a leather or rubber diaphragm 30 and secured to this diaphragm is a metal plate 31 which has riveted to it the cylindrical projection 32 moving in the cylindrical projection 33 on the governor casing. The relative movement of the parts 32 and 33 is limited by a pin 34 entering the slot 35. Water is forced through the pipe 36 by means which will be understood varying in speed with the speed of the motor and this water entering the governor casing bears upon the diaphragm 30 tending to force it to the left in Fig. 5 in accordance with the pressure with which the water is driven through the pipe 36. The link arm 8 is pivotally connected at 37 to the cylindrical extension or sleeve 32 and as above described is pivotally connected at its other end to the projection 7 upon the arm 6. It will be seen by reference to Fig. 1 that when the throttle valve is open the link arm 8 extends in a direction almost in line with the shaft 5 of the throttle valve, whereby the leverage is very slight and consequently the governor exerts very little force in tending to close the valve. This arrangement of connection between the governor and throttle arm reduces the power necessary in operating the accelerator pedal to positively open the throttle against the action of the governor. In order to prevent the link arm 8 from reaching the dead center line with the shaft 5 a stop 38 is placed on the intake casing against which the arm 6 strikes. The pipes 39 and 40 are the water pipes for supplying heating liquid to the jacket of the intake.

Having thus described the invention, what is claimed is:

1. In a motor vehicle, the combination with the motor intake and the throttle valve therein, of a governor connected to said valve, and manually controlled means having a yielding connection with said valve adapted to become a rigid connection when said valve has been opened a predetermined amount.

2. In a motor vehicle, the combination with a valve, of a device for opening said valve comprising spring means which operates yieldingly during the first part of the opening movement and rigidly during the latter part thereof.

3. In a motor vehicle, the combination with the motor intake and the throttle valve therein, of devices for controlling said valve comprising yielding spring means which becomes rigid as the valve is opened.

4. In a motor vehicle, the combination with the motor intake and the throttle valve therein, of a manual operating lever, and devices for controlling said valve from said lever including a yielding spring connection which becomes rigid as the throttle valve is opened by said lever.

5. The combination with a valve, of a control lever therefor, and spring means whereby a given movement of said lever operates to yieldably open said valve a fractional amount and a continued movement of said lever operates to positively open said valve more fully.

6. In a motor vehicle, the combination with the motor intake and the throttle valve therein, of two actuating devices for said valve, one of which is positively connected with said valve and the other of which is flexibly connected with said valve, said flexible connection becoming rigid as the valve is opened by the latter of said devices.

7. In a motor vehicle, the combination with the intake of a hydrocarbon engine, of a throttle valve in said intake, an arm for operating said valve, a governor, a rod positively connecting said governor with said arm and so arranged that the angle between the rod and said arm increases as the valve is opened, a foot lever, and a rod positively connecting said foot lever and said valve arm.

8. In a motor vehicle, the combination with the intake of a hydrocarbon engine, of a throttle valve in said intake, an arm for operating said valve, a governor, a rod positively connecting said governor with said arm and so arranged that the angle between the rod and said arm increases as the valve is opened, a foot lever, a rod positively connecting said foot lever and said valve arm, a steering column for the vehicle, a lever at the base of said steering column embracing said last mentioned rod, spring connection between said lever and rod, and hand operated means on said column for operating said lever.

9. In a motor vehicle, the combination with the intake of a hydrocarbon engine, of a throttle valve in said intake, an arm for operating said valve, a governor, a rod positively connecting said governor with said arm and so arranged that the angle between the rod and said arm increases as the valve is opened, a rod positively connected to said valve arm, a lever embracing said rod having spring connection therewith, and means for moving said lever and holding it in adjusted positions.

10. In a motor vehicle, the combination with the intake of a hydrocarbon engine, of a throttle valve in said intake, a governor adapted to automatically close said valve, means for opening said valve against the action of the governor, said parts being so arranged that the resistance of the governor decreases as the valve is opened.

11. In a motor vehicle, the combination with the intake of a hydrocarbon engine, of a throttle valve in said intake, an arm for actuating said valve, a governor operatively connected with said arm and adapted to automatically move the arm to close the valve, and manually operable means for opening the valve against the action of the governor, said parts being so arranged that the resistance of the governor to said manually operable means decreases as the valve is opened.

12. In a motor vehicle, the combination with the intake of a hydrocarbon engine, of a pivotally mounted throttle valve in said intake, an arm connected with the pivot of said valve and adapted to actuate the valve, a governor, a manually operable lever, a rod connecting said lever with said arm, and means connecting the governor with said arm and having pivotal connection with the arm at a point out of the line between the valve pivot and the connection between the arm and said rod.

13. In a motor vehicle, the combination with the intake of a hydrocarbon engine, of a pivotally mounted throttle valve in said intake, an arm connected with the valve pivot and adapted to actuate the valve, a foot lever, a rod pivotally connecting said foot lever and said arm, a governor arranged on the opposite side of said arm from said foot lever, a rod operatively connecting said governor with said arm, a hand lever, and means connecting said hand lever and said arm and yieldable for a certain portion of the stroke of the hand lever and rigid for the remaining portion of the stroke thereof.

In testimony whereof I affix my signature in presence of two witnesses.

ALLEN LOOMIS.

Witnesses:
E. N. HEARN,
C. I. DALE.